United States Patent Office 2,953,151
Patented Sept. 20, 1960

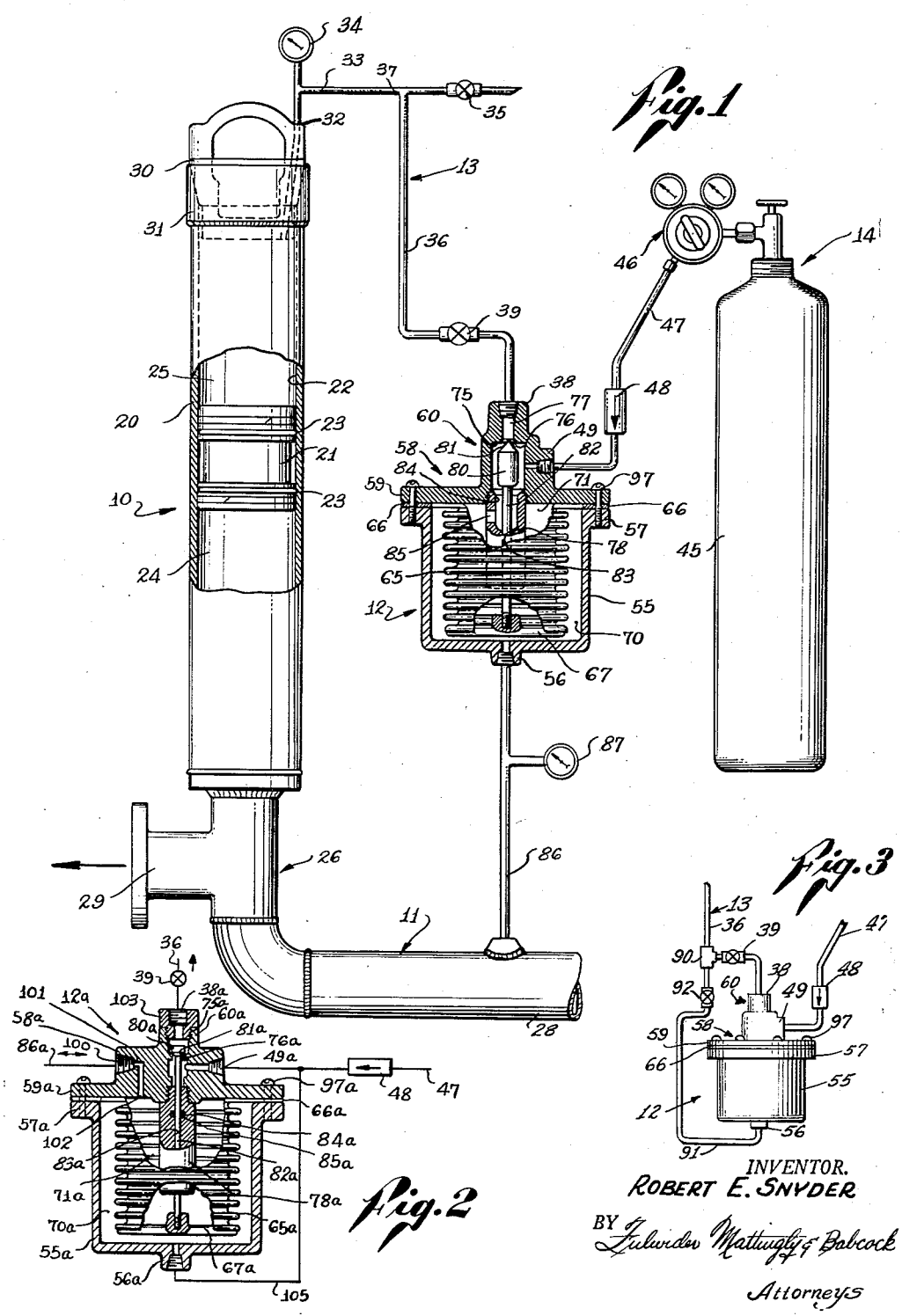

2,953,151

AUTOMATIC PRECHARGE MECHANISM

Robert E. Snyder, 256 E. Orange Grove, Pasadena, Calif.

Filed Dec. 28, 1953, Ser. No. 400,687

5 Claims. (Cl. 137—100)

My invention relates to automatic gas pressure controls and more particularly to a valve and a system to maintain the gas precharge in a hydropneumatic shock and surge absorber at a predetermined minimum.

In hydropneumatic shock absorbers as well as practically all types of hydropneumatic accumulators wherein a gas cushion is used, a certain amount of the gas precharge in the unit will escape or be lost over a period of time during operation of the unit. In the enclosed bag type units the rate of gas loss may be very small, whereas in diaphragm and in piston types the rate may be substantially higher. It is therefore a major object of this invention to provide a valve and a system whereby the hydropneumatic unit may have its gas precharge automatically restored to a predetermined value.

All hydraulic systems have certain hours or periods when they are shut down and when the main operating pressures in the hydraulic fluid are allowed to drop below the normal operating value. This may be during the hours when the equipment is being serviced or when the hydraulic equipment is not in use. It is thus a further object of the invention to provide a means for automatically precharging the hydropneumatic unit whenever the main line hydraulic working pressure drops below the normal operating value.

In previous systems of this type, a common spring loaded check valve in the precharge line has been used. This valve is held closed by back pressure from the hydropneumatic unit whenever that pressure exceeds the preset precharge gas pressure. Theoretically the check valve is supposed to open and permit the entry of more precharge gas when the hydraulic line pressure drops below the precharge pressure. However, a spring loaded check valve requires a substantial spring pressure to insure its being absolutely leakproof when subjected to back pressure against the check; and conversely upon gas flow against the spring loaded check valve during the precharging cycle the spring pressure holding the check valve closed, acts as a pressure reducer. Thus the gas precharge pressure has to be set above the pressure desired in the hydropneumatic unit by that amount required to overcome the check valve spring pressure. As a result accurate control of the precharge gas pressure is very difficult to attain, especially where close control within two to five p.s.i. or less is required.

It is therefore an object of the present invention to provide a gas valve in the precharge line which will close positively against back pressure from the working hydropneumatic unit but which will open freely with little or no back pressure on the precharge gas during the precharge cycle.

A further difficulty with the use of standard ball or poppet type check valves in the above described application in their tendency to stick in the closed position after being subjected to an extended period of high back pressure from the hydropneumatic unit. This sticking may be so tight that the gas precharge pressure cannot break through and as a result the automatic precharging system fails to function. It is thus still another object of the invention to provide for positive opening of the gas valve on the precharge cycle so that the precharge system can be reliable in operation.

In most check valves the ratio of the effective area to the valve seat area is very small and the sticking of the valve in the seat requires a relatively high hydraulic pressure to unseat and open the valve. In many hydropneumatic precharge systems the pressure differential across the valve is very small and when the check valve sticks the system becomes immediately inoperable. It is thus another object of the invention to provide large operating areas in the gas valve which will utilize even very small pressure differentials over these large areas to develop very substantial force as may be required to unseat or to solidly close the valve against any tendency to stick either open or closed.

In using a standard spring counterbalanced diaphragm type motor valve to open or close the precharge gas to the hydropneumatic unit, the operating pressure of the spring has to be closely adjusted to any change in the precharge pressure. It is a still further object of the invention to provide power to open the precharge valve from the precharge gas source and therefore make it automatically adjustable therewith.

A further object is to provide a valve and system that is simple and rugged in construction, relatively foolproof in operation, completely enclosed but easily serviced and economical to manufacture.

These and other objects and advantages of the present invention will become apparent from the specification, read in conjunction with the drawings, wherein:

Figure 1 is a diagrammatical layout of the system including a vertical section of the gas valve;

Figure 2 is a vertical section of an alternate structure of the gas valve; and

Figure 3 is a diagrammatic layout of an alternative system utilizing the valve of Figure 1.

By reference to Figure 1 a piston type hydropneumatic unit 10 is connected into a hydraulic line 11 and a gas precharge valve 12 is connected into the gas precharge line 13 between the bottle gas source 14 and the hydropneumatic unit. The gas precharge valve 12 is opened or closed by pressure variations in the main line in view of the gas precharge pressure. More specifically the hydropneumatic unit shown in Figure 1 is a piston type unit which is comprised essentially of a tubular body 20 having a piston 21 slidably mounted within the bore 22 of the body. The piston is provided with seal rings 23 which engage the bore and prevent leakage past the piston. The bore is thus divided into two dependently variable chambers 24 and 25; chamber 24, below the piston, being open to the main hydraulic line 11, and chamber 25, above the piston, being open to the precharge gas. The particulars of the piston type unit are shown in my copending patent application Serial No. 710,490, now Patent No. 2,663,320. However, any type of hydropneumatic unit using a piston, a diaphragm, a semi-bag, a bag, or similar type separatory means between the main line fluid and the precharge gas, can be used.

The connection 26 between the hydropneumatic unit and the main line 11 is commonly a standard T one branch of which is open to the chamber 24 or liquid side of the unit and the other two branches of which are connected into the main line. The main line piping 11 shown in Figure 1 is a standard layout in which the line fluid enters from the system at one end 28 as indicated by the arrow and passes out through the right angle branch 29 of the T as indicated by the arrow back into the system.

The top of the tubular body 20 of the hydropneumatic unit is closed by a plug 30 threaded into a boss 31 affixed to the top of the body. A gas port 32 is provided in the plug from which piping 33 branches to a gas pressure gauge 34 and a manually controlled blow-off valve 35. A pipe 36 is connected at one end to a T 37 in pipe 33 inwardly of the blow-off valve 35, and at the other end to the gas outlet port 38 on the gas valve 12, with a hand shut off valve 39 positioned medially therein. By closing the blow-off valve 35 and opening the hand shut-off valve 39 precharge gas from the gas valve 12 may pass into chamber 25 of the hydropneumatic unit 10. And, by closing the shut-off valve 39 and opening the blow-off valve 35, the precharge gas in chamber 25 may be released to the outside air.

The system precharge gas supply 14 is comprised of a bottle 45 of gas (usually nitrogen) under high pressure. A standard type manually-variable gas regulator 46 attached to the bottle is used to adjust the pressure of the precharge gas to any desired value. Both gas bottles and regulators are commercial items available on the market and they form but one convenient source of precharge gas. The precharge gas from the regulator 46 passes into a pipe 47, through a small line check 48 and into the gas inlet port 49 of gas valve 12. The use of check valve 48 is optional and it merely serves as will hereinafter be described to aid in a small way to support the bellows in the gas valve 12 against the line pressure applied externally against the bellows. It will not be subjected to severe back pressure from the working hydropneumatic unit such as might cause it to stick. If it should leak, no loss of gas will be felt in the hydropneumatic unit.

The main gas valve 12 opens or closes off the flow of precharge gas into the gas chamber 25 of the hydropneumatic unit in response to actuation by the main line fluid pressure respectively below or above a given critical value. The gas valve is comprised of a cup-shaped base 55 having a threaded boss fluid port 56 in the bottom and an exteriorly extending flange 57 around the top. A cover 58 provided with a flange 59, complemental and sealably attached to the base flange 57, carries valve housing 60 and the gas inlet and outlet ports 49 and 38 respectively. A Sylphon separatory diaphragm 65 having a top flange 66 and a bottom plate 67 is positioned within the base 55. The Sylphon flange 66 is positioned between the base flange 57 and the cover flange 59, and the three flanges are sealably pressed together by suitable screws 97 through the three flanges. Suitable gaskets (not shown) between the sealing faces of the flanges may be employed in the conventional manner to render the flange joints leakproof.

The Sylphon diaphragm assembly thus divides the interior of gas valve base 55 into two separate but dependently variable chambers 70 and 71; chamber 70 lying between the outside of the Sylphon 65 and the inside of the base 55; and chamber 71, inside the Sylphon 65. Chamber 70 is open to the line fluid port 56 and chamber 71 is open to the two gas ports 38 and 49.

The valve housing 60 extends above the cover flange 59 and has the gas outlet port 38 located on its extreme upper end while the gas inlet port 49 is located in the side of the valve housing just above the cover flange. Valve housing 60 is provided with a bore 75, the upper portion of which carries a valve seat 76 at the juncture of the opening 77 from the gas outlet port 38. Gas inlet port 49 opens into the bore 75 at a point below the valve seat. A valve guide 78 is threadedly engaged in the lower end of the bore 75 and extends downwardly therefrom into the interior of the Sylphon 65, the lower face of the valve guide serving as a stop against extreme upward movement of the Sylphon bottom plate 67.

A valve 80 having a face 81 complementally shaped to valve seat 76 is positioned within valve housing 60 and is mounted on a valve stem 82 which is threadedly attached to bottom plate 67 of the Sylphon. The valve stem and its attached valve and bottom plate are held in axial alignment during normal reciprocatory movement by passage of the stem through a bore 83 in the valve guide 78. The upper portion of the valve guide is provided with a counterbore 84 and a crossbore 85 to form a gas passage connecting the chamber 71 inside the Sylphon with the bore 75 of the valve housing.

The fluid port 56 on the bottom of the gas valve 12 is connected directly through the pipe 86 to the main line 11. This pipe 86 may be further provided with a pressure gauge 87 teed into the pipe to give the operator knowledge of the main line pressure.

Thus as installed in the above system, the gas valve 12 receives fluid from main line 11 through the pipe 86 and port 56 into chamber 70. The pressure of this line fluid compresses the Sylphon 65 upwardly, moving the valve stem 82 with its valve 80 upwardly to seat the valve firmly against seat 76 at the upper end of bore 75, thereby closing off the flow of gas from the bore 75 into the precharge pipe 36. The precharge gas entering from the regulated source 14 through port 49 passes into bore 75 and down through the counterbore 84 and the crossbore 85 into chamber 71 inside the Sylphon 65.

Thus the precharge gas pressure acts against the fluid pressure from the main line, and movement of the Sylphon and valve 80 to open or to close the valve 80 depends upon which pressure is the highest. The precharge gas pressure set at any required value supplies the force to open the gas valve to admit precharge gas through the piping into the hydropneumatic unit and the pressure of the line fluid determines whether this gas valve shall be open or closed. If the line fluid pressure is less than that of the precharge gas, the valve will be opened and if the line fluid pressure rises above that of the precharge gas then the valve will be closed.

In most hydropneumatic units used for the absorption of shock and surge, the precharge pressure is usually set a few pounds below the average main line working pressure so that the separatory means of whatever type in the hydropneumatic unit is "floating" just above its extreme lower limit. Thus at all times when the main line is up to its normal working pressure the gas valve 12 remains closed to the passage of precharge gas. Precharge gas may only flow to the hydropneumatic unit when the main line pressure has been decreased below the normal working pressure. However, in many cases this critical range represents but a very few pounds of pressure. In the structure of the present invention the ratio between the valve seat area and the effective area of the Sylphon is so great that only a very small pressure differential between the precharge gas pressure and the main line pressure is sufficient to open or to close the gas valve. Its operation therefore becomes both assured and positive. In addition, if the main line pressure were to rise to extreme values and the gas back pressure from the hydropneumatic unit against the gas valve were to be correspondingly high, the large ratio between the area of the gas valve and the Sylphon would insure a correspondingly great force being applied to keep the gas valve closed against leakage of the high pressure gas from the hydropneumatic unit back into the precharge gas source.

In the preferred structure shown in Figure 1, the highest system pressures are applied to the outside of the Sylphon from which direction it will sustain a much greater crushing load than it would take from the inside as an expanding force. The precharge pressure is usually small as compared to the possible main line maximum pressures.

By reference to Figure 2 an alternate structure of the gas valve is shown. This structure is substantially an inversion of the valve structure shown in Figure 1. In this alternate structure, the gas precharge pressure is on the outside of the Sylphon, and the main line pressure is directed into the inside of the Sylphon so that the gas pressure tends to axially compress the bellows whereas the line pressure tends to axially expand the bellows. The valve means is also inverted to utilize this reversed movement of the bellows.

More specifically, by reference to Figure 2, the gas valve 12a is comprised of a cup-shaped base 55a having a threaded boss gas port 56a in the bottom and an exteriorly extending flange 57a around the top. A cover 58a provided with a flange 59a, complemental and attached to the base flange 57a, carries the valve housing 60a, the gas inlet and outlet ports, 49a, and 38a respectively, and the line fluid port 100. A Sylphon separatory diaphragm 65a having a top flange 66a and a bottom plate 67a is positioned within the base 55a. The Sylphon flange 66a is positioned between the base flange 57a and the cover flange 59a, and the three flanges are sealably pressed together by suitable screws 97a through the three flanges. Suitable gaskets (not shown) between the sealing faces of the flanges may be employed in the conventional manner to render the flange joints leakproof.

The Sylphon diagram assembly thus divides the interior of the gas valve base into two dependently variable chambers 70a and 71a; chamber 70a lying between the outside of the Sylphon 65a, and the inside of the base 55a; and chamber 71a, inside the Sylphon 65a. Chamber 70a is open to the gas port 56a and chamber 71a is open to the main line fluid through the cross bores 101 and 102 to the fluid port 100 in the cover 58a and line 86a to the main line 11.

The valve housing 60a extends above the cover flange 59a and has gas outlet port 38a mounted in an externally threaded boss 103 sealably screwed into a complementally threaded bore 75a upon the extreme upper end of the valve housing. The extension of bore 75a below boss 103 is provided with a valve seat 76a upon the upward edge of an inwardly extending shoulder in the bore. The gas inlet port 49a opening into bore 75a is located in the side of the valve housing below the valve seat 76a and above cover flange 59a. A valve guide 78a is threadedly engaged in the lower end of bore 75a and extends downwardly from the underside of cover flange 59a into the interior of Sylphon 65a, the lower face of the valve guide serving as a stop against the extreme upward movement of the Sylphon bottom plate 67a.

A valve 80a having a face 81a complementally shaped to the valve seat 76a is positioned within the housing 60a between boss 103 and valve seat 76a. The valve 80a is mounted on a valve stem 82a and extending downwardly therefrom is threadedly attached to bottom plate 67a of the Sylphon.

The valve stem 82a and its attached valve 80a and bottom plate 67a are held in axial alignment during their normal reciprocatory movement by passage of the stem through the bore 83a in the valve guide 78a. In order to prevent intermixture of the gas in bore 75a above the valve guide and the line fluid in chamber 71a, packing means 84a is positioned within a suitable recess 85a in the valve guide bore 83a, making sealable contact with the valve stem and so isolating the fluids.

The fluid port 100 is connected directly through the pipe 86a to the main line 11. The gas port 56a is connected by an extension line 105 into the gas line 47 between check valve 48 and gas inlet port 49a upon the gas valve cover.

Thus, this alternate structure valve 12a as installed in the system receives line fluid into its chamber 71a and precharge gas into its chamber 70a and that portion of the bore 75a below the valve seat 76a. The pressure of the line fluid downwardly upon the Sylphon bottom plate 67a carries with it the valve 80a and seats the valve face 81a firmly against valve seat 76a, shutting off the passage of precharge gas from the lower portion of bore 75a below the valve seat into the upper portion of the bore 75a and out into the precharge pipe 36.

As in the operation of the gas valve 12 in Figure 1, the precharge gas pressure acts against the fluid pressure from the main line and the movement of the Sylphon carrying with it the valve 80a to open or to close the valve 80a depends upon which pressure is highest. The precharge gas set at any required value, supplies the force to open the gas valve to admit precharge gas through the piping into the hydropneumatic unit and the pressure of the line fluid determines whether this gas valve shall be open or closed in the manner heretofore described.

The major advantage of this form of a gas valve over that shown in Figure 1 is that the back pressure in line 36 from the hydropneumatic unit under high main line pressures, causes the gas valve 80a to be more firmly held against its seat 76a instead of less firmly as in the structure of gas valve 12. However, the line pressure being applied from within the Sylphon 65a requires a heavier Sylphon with a corresponding decrease in sensitivity of the valve. The relative value of the two structures will be dictated by the other prerequisites of the system in which the gas valve is used.

It is understood that the Sylphon structure in the gas valve may be replaced by a mechanically equivalent piston cylinder structure or some other equivalent expandable chamber of which there are a number of possible alternates. However, the Sylphon is simple and rugged, will operate over a wide range of temperatures, is safe with a wide variety of fluids and is very sensitive.

In the operation of a hydropneumatic unit, the gas pressure in chamber 25 follows very closely the main line fluid (liquid) pressure in the lower chamber 24. Thus the gas valve 12 of Fig. 1 may be connected to the system in a different way and still produce practically identical results. As may be noted in Figure 3, the fluid port 56 of the gas valve, instead of being connected into the main line 11 through the pipe 86 may be connected directly into the precharge gas line 36 through a T at some point 90 by a pipe 91 having a hand shut off valve 92. When connected into the system in this manner, the balance between the precharge gas pressure within chamber 71 as counterbalanced against the gas back pressure in the hydropneumatic unit which reaches chamber 70 through the pipes 36 and 91 will cause the gas valve to open or to close in practically the same manner as previously described.

It should be noted, however, that the gas pressure in the chamber 25 will not necessarily drop down to zero as the main line pressure may do, but will only fall back to whatever value the precharge pressure has when the separatory means rests at the extreme lowest position in the hydropneumatic unit. Thus with the gas valve 12 connected in the above described alternate position of Figure 3, the pressure in chamber 70 will only fall to the minimum level of the gas in chamber 25. If this pressure is below the gas regulator precharge pressure then the gas valve will open and allow precharge gas to enter the hydropneumatic unit chamber 25. As this pressure increases up to the precharge level the gas valve will gradually close.

While the gas valve will operate satisfactorily when connected in this manner into the system it will be slower in building up the precharge pressure in the hydropneumatic unit due to the gradual shut off of the gas valve as the pressure in the two chambers 70 and 71 approach each other. The gas valve 12 will operate more positively if chamber 70 is connected directly to the main line as was described in the preferred way earlier in the specification and shown in Figure 1.

I have thus disclosed improved precharge gas control valves possessing advantages not had in previously used valves. It is obvious that modifications may be made in the construction of such valves, and I do not wish to be limited to the particular form or arrangement of parts herein described and shown except as limited by my claims.

I claim:
1. A system for maintaining a precharge of gas in a hydropneumatic shock and surge absorber unit for a main liquid line under varying pressure, comprising: a main liquid line; a hydropneumatic unit associated with said main line; a source of precharge gas under regulated pressure in communication with said hydropneumatic unit; a valve means for controlling flow between said precharge gas source and said hydropneumatic unit comprising a valve housing, an outlet in said housing leading to said hydropneumatic unit, a valve seat in said housing surrounding said outlet, and a valve member reciprocally mounted in said valve housing to co-act with said valve seat to control flow from said precharge gas source to said hydropneumatic unit; and a pressure-responsive movable separatory means in said housing dividing a portion of said housing into two dependently variable chambers, each chamber having a single inlet to establish communication of one of said chambers with said source of precharge gas and to establish communication of the other of said chambers with varying pressures in said hydropneumatic unit, said valve member being connected to and actuated by said separatory means in response to differential pressure in said chambers.

2. A system for maintaining a precharge of gas in a hydropneumatic shock and surge absorber unit for a main liquid line under varying pressure, comprising: a main liquid line; a hydropneumatic unit associated with said main line; a source of precharge gas under regulated pressure in communication with said hydropneumatic unit; and a valve means for controlling flow between said precharge gas source and said hydropneumatic unit comprising a housing, a pressure-responsive movable separatory means in said housing dividing said housing into two dependently variable chambers, a first inlet in said housing establishing communication between said precharge gas source and one of said chambers, a second inlet in said housing establishing communication between said main line and the other of said chambers, an outlet in a valve chamber portion of said housing leading from said valve chamber to said hydropneumatic unit, a valve seat in said valve chamber surrounding said outlet, and a valve member reciprocally mounted in the valve chamber to co-act with said valve seat to control flow from said source to said hydropneumatic unit, said valve member being connected to and actuated by said separatory means in response to differential pressure in said dependently variable chambers.

3. A system for maintaining a precharge of gas in a hydropneumatic shock and surge absorber unit for a main liquid line under varying pressure, comprising: a main liquid line; a hydropneumatic unit associated with said main line; a source of precharge gas under regulated pressure in communication with said hydropneumatic unit; and a valve means for controlling flow between said precharge gas source and said hydropneumatic unit comprising a valve housing, a pressure-responsive movable separator means in said housing dividing said housing into two dependently variable chambers, a first inlet in said valve housing establishing communication between said precharge gas source and one of said chambers, a second inlet in said valve housing establishing communication between said main line and the other of said chambers, an outlet in said housing leading from said one of said chambers to said hydropneumatic unit, a valve seat in said housing surrounding said outlet, and a valve member reciprocally mounted in the valve housing to co-act with said valve seat to control flow from said one of said chambers to said hydropneumatic unit, said valve member being connected to and actuated by said separatory means in response to differential pressure in said chambers.

4. A system for maintaining a precharge of gas in a gas chamber of a hydropneumatic shock and surge absorber unit for a main liquid line under varying pressure, comprising: a main liquid line; a hydropneumatic unit associated with said line and having a gas chamber; a source of precharge gas under regulated pressure in communication with said gas chamber of said hydropneumatic unit; and a valve means for controlling flow between said precharge gas source and said gas chamber comprising a housing, a pressure-responsive movable separatory means in said housing dividing said housing into two dependently variable chambers, a first inlet in said housing establishing communication between said precharge gas source and one of said variable chambers, a second inlet in said housing establishing communication between said main line and the other of said variable chambers, an outlet in a valve chamber portion of said housing, separate from said two dependently variable chambers, through which said source of precharge gas communicates with said gas chamber of said hydropneumatic unit, a valve seat in said valve chamber surrounding said outlet, and a valve member reciprocally mounted in the valve chamber to co-act with said valve seat to control flow from said source to said gas chamber of said hydropneumatic unit, said valve member being connected to and actuated by said separatory means in response to differential pressure in said variable chambers.

5. A system for maintaining a precharge of gas in a hydropneumatic shock and surge absorber unit for a main liquid line under varying pressure, comprising: a main liquid line; a hydropneumatic unit associated with said main line and having a gas chamber; a source of precharge gas under regulated pressure in communication with said gas chamber of said hydropneumatic unit; a valve means for controlling flow between said precharge gas source and said gas chamber of said hydropneumatic unit comprising a valve housing, a pressure-responsive movable separatory means in said housing dividing said housing into two dependently variable chambers, a first inlet in said valve housing establishing communication between said precharge gas source and one of said dependently variable chambers, a second inlet in said valve housing establishing communication between said gas chamber of said hydropneumatic unit and the other of said variable chambers, an outlet in said housing leading from said one of said variable chambers to said gas chamber of said hydropneumatic unit, a valve seat in said housing surrounding said outlet, and a valve member reciprocally mounted in the valve housing to co-act with said valve seat to control flow from said one of said variable chambers to said gas chamber of said hydropneumatic unit, said valve member being connected to and actuated by said separatory means in response to differential pressure in said dependently variable chambers.

References Cited in the file of this patent
UNITED STATES PATENTS

| | | |
|---|---|---|
| 2,592,613 | Snyder | Apr. 15, 1952 |
| 2,637,690 | Everson | May 5, 1953 |